United States Patent
Minamii et al.

(10) Patent No.: US 10,076,965 B2
(45) Date of Patent: Sep. 18, 2018

(54) CHARGING APPARATUS

(71) Applicant: TOYOTA JIDOSHA KABUSHIKI KAISHA, Toyota-shi, Aichi-ken (JP)

(72) Inventors: Toshihiko Minamii, Toyota (JP); Jun Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 15/267,920

(22) Filed: Sep. 16, 2016

(65) Prior Publication Data
US 2017/0087998 A1 Mar. 30, 2017

(30) Foreign Application Priority Data
Sep. 25, 2015 (JP) .................. 2015-187982

(51) Int. Cl.
H02J 7/00 (2006.01)
B60L 11/18 (2006.01)
H02J 7/14 (2006.01)

(52) U.S. Cl.
CPC ....... B60L 11/1811 (2013.01); B60L 11/1861 (2013.01); H02J 7/1423 (2013.01)

(58) Field of Classification Search
CPC .. H02J 7/1423; B60L 11/1811; B60L 11/1861
USPC ....... 320/107, 104, 125, 133, 134, 140, 155, 320/159, 160, 162
See application file for complete search history.

(56) References Cited

U.S. PATENT DOCUMENTS

| 5,274,321 | A  | * | 12/1993 | Matsuda | ................. | H02J 7/008 |
|---|---|---|---|---|---|---|
|  |  |  |  |  |  | 320/157 |
| 9,490,642 | B2 | * | 11/2016 | Kim | ..................... | H02J 7/0077 |
| 9,931,950 | B2 | * | 4/2018 | Demure | ............. | B60L 11/1811 |
| 2005/0061561 | A1 | * | 3/2005 | Leonardi | ................. | B60K 6/28 |
|  |  |  |  |  |  | 180/65.1 |

(Continued)

FOREIGN PATENT DOCUMENTS

| JP | H05-122871 A | 5/1993 |
|---|---|---|
| JP | 2000-324822 A | 11/2000 |

(Continued)

OTHER PUBLICATIONS

Aug. 16, 2016 U.S. Appl. No. 15/238,199 filed in the name of Suzuki.

Primary Examiner — Phallaka Kik
(74) Attorney, Agent, or Firm — Oliff PLC

(57) ABSTRACT

A charging apparatus includes: a first conversion circuit that converts alternating-current power supplied from an external power supply into direct-current power; a second conversion circuit that converts an output voltage from the first conversion circuit into a voltage for a battery and supplies the voltage to the battery; and a controller configured to change charging power to be supplied to the battery by controlling the first conversion circuit and the second conversion circuit when the output voltage falls outside a predetermined reference range, and to determine whether the output voltage in the changed charging power falls within the reference range. When the output voltage falls outside the reference range, the controller controls the first conversion circuit and the second conversion circuit such that the charging power decreases stepwise until the output voltage falls within the reference range.

7 Claims, 8 Drawing Sheets

(56) References Cited

U.S. PATENT DOCUMENTS

| | | | |
|---|---|---|---|
| 2005/0162793 A1* | 7/2005 | Lai | H02J 7/0055 |
| | | | 361/90 |
| 2008/0024948 A1* | 1/2008 | Takamura | H01M 2/348 |
| | | | 361/91.1 |
| 2009/0322287 A1* | 12/2009 | Ozeki | H02J 7/0018 |
| | | | 320/145 |
| 2011/0234159 A1 | 9/2011 | Ohtomo et al. | |
| 2011/0260691 A1* | 10/2011 | Ishibashi | B60L 11/1842 |
| | | | 320/134 |
| 2013/0231811 A1* | 9/2013 | Aoki | B60L 11/18 |
| | | | 701/22 |
| 2014/0239894 A1* | 8/2014 | Mitsutani | H02J 7/04 |
| | | | 320/109 |
| 2015/0061377 A1* | 3/2015 | Ishikawa | B61C 3/02 |
| | | | 307/9.1 |
| 2015/0137592 A1* | 5/2015 | Kono | H02M 3/33507 |
| | | | 307/9.1 |
| 2015/0263564 A1* | 9/2015 | Min | H02J 7/0091 |
| | | | 307/24 |
| 2017/0098940 A1* | 4/2017 | Syouda | H02J 7/0016 |

FOREIGN PATENT DOCUMENTS

| | | |
|---|---|---|
| JP | 2011-205758 A | 10/2011 |
| JP | 2013-090496 A | 5/2013 |
| JP | 2014-017917 A | 1/2014 |

* cited by examiner

CHARGING APPARATUS

INCORPORATION BY REFERENCE

The disclosure of Japanese Patent Application No. 2015-187982 filed on Sep. 25, 2015 including the specification, drawings and abstract is incorporated herein by reference in its entirety.

BACKGROUND

1. Technical Field

The disclosure relates generally to a charging apparatus, and relates more specifically to a charging apparatus configured to be able to charge a battery with alternating-current (AC) power that is supplied from an external power supply.

2. Description of Related Art

Hybrid vehicles, electric vehicles, and fuel cell vehicles are attracting attention as eco-friendly vehicles. Various technologies for charging a battery mounted in such a vehicle with AC power supplied from a power supply outside the vehicle have been proposed.

For example, Japanese Patent Application Publication No. 2014-17917 (JP 2014-17917 A) discloses an in-vehicle power supply apparatus including an AC-DC converter (specifically, a power factor correction circuit) that converts an alternating current supplied from an AC power supply into a direct current, and a DC-DC converter that converts an output voltage from the AC-DC converter and outputs the converted voltage to a battery. A control device (digital signal processor (DSP)) of the in-vehicle power supply apparatus controls the AC-DC converter and the DC-DC converter such that the output voltage of the AC-DC converter increases or decreases to a target voltage.

SUMMARY

For example, in the in-vehicle power supply apparatus disclosed in JP 2014-17917 A, when an abnormal voltage waveform is input from the AC power supply, the electric power supplied from the AC power supply to the AC-DC converter may be less than that at normal times. Despite this, when charging power is supplied from the DC-DC converter to the battery as usual, an electric power balance between the supply power and the charging power may be lost. As a result, a variation in the output voltage of the AC-DC converter is caused, which is likely to cause a failure of the in-vehicle power supply apparatus. Specifically, there is concern about an overvoltage being applied to the in-vehicle power supply apparatus, or an overcurrent flowing from the AC power supply to the in-vehicle power supply apparatus.

As a countermeasure, for example, a technique of temporarily stopping charging and resuming the charging after the lapse of a predetermined period of time may be employed, when an output voltage of the AC-DC converter falls outside a predetermined reference range due to an abnormal voltage waveform. However, with such a technique, when abnormality of the voltage waveform continues for a relatively long time, an intermittent charging operation (an operation in which charging is re-stopped immediately after charging is resumed) is repeated. In this case, sufficient charging power cannot be secured and a charging time is likely to be too long.

The disclosed embodiments provide a technology that makes it possible to secure as much charging power as possible while protecting a charging apparatus configured to be able to charge a battery with alternating-current power that is supplied from an external power supply even when an abnormal voltage waveform is input into the charging apparatus from the external power supply.

A charging apparatus according to an aspect of the disclosed embodiments is configured to be able to charge a battery with alternating-current power that is supplied from an external power supply. The charging apparatus includes: a first conversion circuit that converts the alternating-current power supplied from the external power supply into direct-current power; a second conversion circuit that converts an output voltage from the first conversion circuit into a voltage for the battery and supplies the voltage to the battery; and a controller. The controller is configured to change charging power to be supplied to the battery by controlling the first conversion circuit and the second conversion circuit when the output voltage falls outside a predetermined reference range, and to determine whether the output voltage in the changed charging power falls within the reference range. When the output voltage falls outside the reference range, the controller controls the first conversion circuit and the second conversion circuit such that the charging power decreases stepwise until the output voltage falls within the reference range.

In the above aspect, when the output voltage from the first conversion circuit falls outside the reference range, the controller may execute cooperative control to control the first conversion circuit and the second conversion circuit such that supply of the charging power is temporarily stopped. Each time a restriction condition is satisfied, the controller may control the first conversion circuit and the second conversion circuit such that the charging power decreases stepwise. The restriction condition is a condition that the number of times the cooperative control is executed within a predetermined period of time reaches a predetermined value.

According to the above aspect, when the output voltage from the first conversion circuit falls outside the reference range, the charging power is adjusted to decrease stepwise until the output voltage of the first conversion circuit falls within the reference range. Since conditions under which a power balance between the electric power input into the first conversion circuit (electric power supplied from the external power supply) and the electric power output from the second conversion circuit (charging power supplied to the battery) is achieved can be found, it is possible to suppress a variation in the output voltage of the first conversion circuit, thereby protecting the charging apparatus. Further, when the output voltage from the first conversion circuit falls within the reference range, charging of the battery is performed under the condition of that moment. That is, since charging is performed under the condition under which the charging power is largest among the conditions under which the power balance is achieved, it is possible to secure as much charging power as possible, unlike a case in which the charging power is greatly restricted all at once.

According to the disclosed embodiments, in the charging apparatus configured to be able to charge the battery with alternating-current power that is supplied from the external power supply, it is possible to secure as much charging power as possible while protecting the charging apparatus even when an abnormal voltage waveform is input into the charging apparatus from the external power supply.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
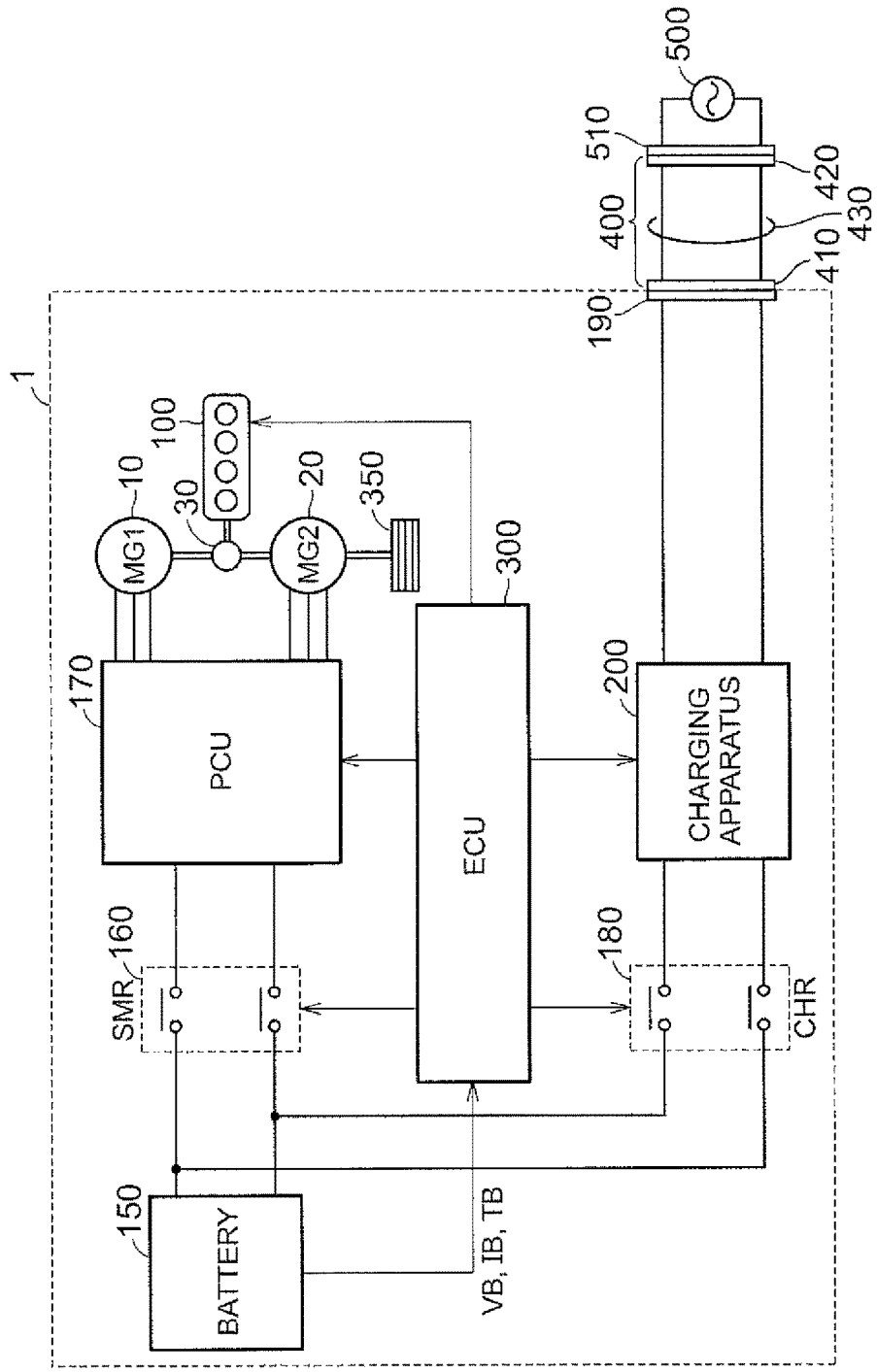
FIG. 1 is a block diagram schematically illustrating an entire configuration of a vehicle in which a charging apparatus according to a first embodiment is mounted.

Hereinafter, disclosed embodiments will be described in detail with reference to the accompanying drawings. The same or corresponding elements in the drawings will be denoted by the same reference numerals and description thereof will not be repeated.

In the disclosed embodiments to be described below, a configuration in which a charging apparatus is mounted in a hybrid vehicle will be described by way of example. However, a vehicle in which the charging apparatus can be mounted is not limited to a hybrid vehicle as long as the vehicle is provided with a battery, and the vehicle may be an electric vehicle or a fuel cell vehicle. Further, applications of the charging apparatus are not limited to applications to vehicles.

First Embodiment

A configuration of a hybrid vehicle will be described. FIG. 1 is a block diagram schematically illustrating an entire configuration of a vehicle in which a charging apparatus according to this embodiment is mounted. Referring to FIG. 1, a vehicle 1 is a hybrid vehicle, and includes a battery 150, a system main relay (SMR) 160, a power control unit (PCU) 170, a motor generator 10 (MG1), a motor generator 20 (MG2), a drive power transmission gear 30, an engine 100, driving wheels 350, and an electronic control unit (ECU) 300.

The battery 150 is an electric power storage device configured to be able to be charged with electric power and to discharge electric power, and includes a secondary battery, such as a lithium ion battery or a nickel hydrogen battery, or a capacitor, such as an electric double layer capacitor. The battery 150 is electrically connected to the PCU 170. The battery 150 supplies electric power for generating drive power of the vehicle 1 to the PCU 170. Further, the battery 150 stores the electric power generated by the motor generators 10, 20.

The battery 150 is provided with a voltage sensor, a current sensor, and a temperature sensor, none of which is illustrated. The voltage sensor detects a voltage VB of the battery 150. The current sensor detects a current IB that is input into and output from the battery 150. The temperature sensor detects a temperature TB of the battery 150. Each sensor outputs the detected value to the ECU 300. The ECU 300 controls charging and discharging of the battery 150 based on the detected values.

The SMR 160 is provided between the battery 150 and the PCU 170, and is electrically connected to the battery 150 and the PCU 170. The SMR 160 makes switching between supply and cutoff of electric power, between the battery 150 and the PCU 170 according to a control signal from the ECU 300.

The PCU 170 includes a converter and an inverter, neither of which is illustrated. The converter boosts a direct-current (DC) voltage from the battery 150. The inverter converts the DC voltage from the converter into an alternating-current (AC) voltage and supplies the AC voltage to the motor generators 10, 20 according to a control signal from the ECU 300.

Each of the motor generators 10, 20 is an AC rotary electric machine, and is, for example, a three-phase AC permanent magnet synchronous motor. An output torque from each of the motor generators 10, 20 is transmitted to the driving wheels 350 via the drive power transmission gear 30 including a speed reducer and a drive power split mechanism.

The motor generator 10 rotates a crankshaft of the engine 100 using the electric power from the battery 150 when the engine 100 starts up. Further, the motor generator 10 can generate electric power using the drive power from the engine 100. The alternating-current (AC) power generated by the motor generator 10 is converted into direct-current (DC) power by the PCU 170 and used to charge the battery 150. In some cases, the AC power generated by the motor generator 10 is supplied to the motor generator 20.

The motor generator 20 rotates a propeller shaft using at least one of the electric power supplied from the battery 150 and the electric power generated by the motor generator 10. Further, the motor generator 20 can also generate electric power through regenerative braking. The AC power generated by the motor generator 20 is converted into DC power by the PCU 170 and used to charge the battery 150.

The engine 100 is an internal combustion engine, such as a gasoline engine or a diesel engine. The engine 100 generates drive power for traveling of the vehicle 1 according to a control signal from the ECU 300.

The vehicle 1 further includes a charge relay (CHR) 180, an inlet 190, and a charging apparatus 200, as a configuration for charging the battery 150 with electric power supplied from an external power supply 500. The external power supply 500 may be an electric power generator or may be a system power supply, such as a commercial power supply.

The electric power from the external power supply 500 is transmitted to the vehicle 1 via a charging cable 400. More particularly, the inlet 190 is provided on an outer surface of the vehicle 1, and is configured such that a connector 410 of the charging cable 400 can be connected to the inlet 190. The charging cable 400 further includes a plug 420 for connection to an outlet 510 of the external power supply 500, and a wire portion 430 that electrically connects the connector 410 to the plug 420.

The charging apparatus 200 is electrically connected to the battery 150 via the CHR 180. Further, the charging apparatus 200 is electrically connected to the inlet 190. The charging apparatus 200 converts the AC power supplied from the external power supply 500 via the inlet 190 into DC power, which is charging power of the battery 150, according to a control signal from the ECU 300.

The CHR 180 is provided between the battery 150 and the charging apparatus 200, and is electrically connected to the battery 150 and the charging apparatus 200. The CHR 180 makes switching between supply and cutoff of electric power from the charging apparatus 200 to the battery 150 according to a control signal from the ECU 300.

Although not illustrated, each of the ECU 300 and a charging ECU 250 to be described below (see FIG. 2) includes, for example, a central processing unit (CPU), a memory, and an input-output buffer. The ECU 300 controls various devices such that the vehicle 1 is in a desired travel state, based on a signal from each of the sensors and devices, and a map and a program stored in the memory. Various controls are not limited to processes implemented by software, and may be processes implemented by dedicated hardware (electronic circuit).

Figure 2:
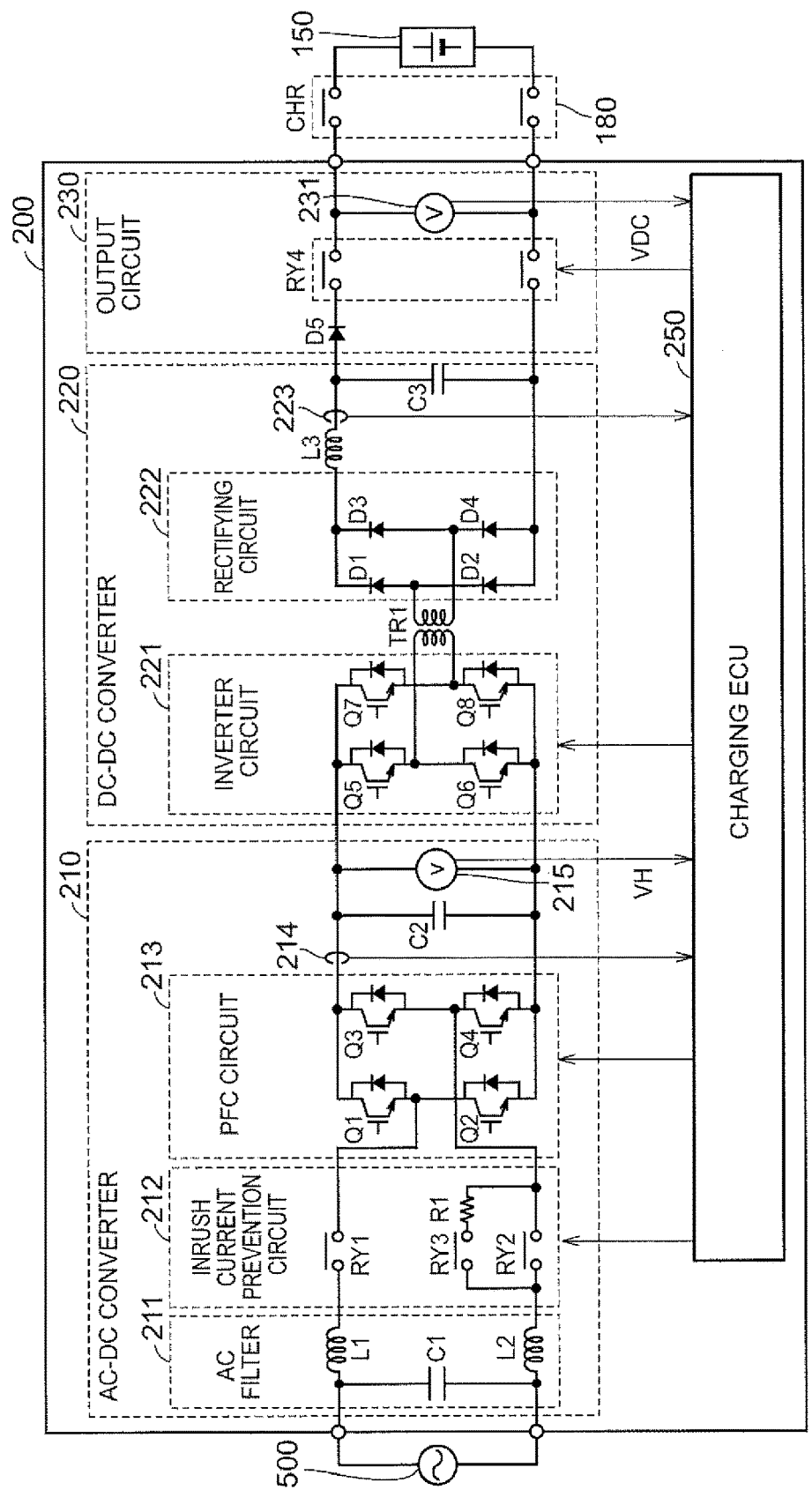
FIG. 2 is a circuit block diagram illustrating a detailed configuration example of the charging apparatus.

Next, a configuration of the charging apparatus will be described. FIG. 2 is a circuit block diagram illustrating a detailed configuration example of the charging apparatus 200. Referring to FIG. 2, the charging apparatus 200 includes an AC-DC converter 210, a DC-DC converter 220, an output circuit 230, and a charging electronic control unit (ECU) 250.

The AC-DC converter 210, which may function as a first conversion circuit, converts the AC power supplied from the external power supply 500 into DC power. The AC-DC converter 210 includes an AC filter 211, an inrush current prevention circuit 212, a power factor correction (PFC) circuit 213, a current sensor 214, a capacitor C2, and a voltage sensor 215.

The AC filter 211 includes reactors L1, L2, and a capacitor C1. The reactors L1, L2 are respectively provided on an electric power line on the positive side and an electric power line on the negative side. The capacitor C1 is provided between these electric power lines, and is connected to these electric power lines. The AC filter 211 removes a noise component included in the AC power supplied from the external power supply 500.

The inrush current prevention circuit 212 includes relays RY1 to RY3, and a resistor R1. The relays RY1 and RY2 are respectively provided on the electric power line on the positive side and the electric power line on the negative side, and makes switching between supply and cutoff of electric power from the external power supply 500. The relay RY3 and the resistor R1 are connected to each other in series, and are connected in parallel with the relay RY2. When the charging apparatus 200 is powered on, the relay RY2 is left open and the relays RY1, RY3 are closed. Thus, part of the current is consumed by the resistor R1, and a current flowing into the capacitor C2 can be reduced. As a result, the inrush current can be prevented from flowing into the capacitor C2. When pre-charge of the capacitor C1 is completed, the relay RY2 is closed, and then the relay RY3 is opened.

The PFC circuit 213 includes switching devices Q1 to Q4. The switching devices Q1 to Q4 constitute a full bridge. The switching devices Q1 to Q4 rectify the AC power into DC power and cause an AC component of the direct current to approximate a sinusoidal wave, thereby improving a power factor.

The current sensor 214 detects an output current from the PFC circuit 213, and outputs the detected value to the charging ECU 250.

The capacitor C2 is provided between output nodes of the PFC circuit 213, and is connected to the output nodes of the PFC circuit 213. The capacitor C2 smooths the DC voltage output from the PFC circuit 213.

The voltage sensor 215 is connected in parallel with the capacitor C2. The voltage sensor 215 detects an output voltage VH from the PFC circuit 213, and outputs the detected value to the charging ECU 250.

The DC-DC converter 220, which may function as a second conversion circuit, converts the output voltage VH from the AC-DC converter 210 into a DC voltage VDC. The DC voltage VDC corresponds to a charging voltage of the battery 150. The DC-DC converter 220 includes an inverter circuit 221, a transformer TR1, a rectifying circuit 222, a choke coil L3, a current sensor 223, and a capacitor C3.

The inverter circuit 221 includes switching devices Q5 to Q8. The switching devices Q5 to Q8 convert the DC power output from the AC-DC converter 210 into AC power and supply the AC power to a primary winding of the transformer TR1 according to a control signal from the charging ECU 250.

The transformer TR1 converts the AC voltage from the inverter circuit 221 into an AC voltage having a voltage value corresponding to a winding ratio between the primary winding and a secondary winding.

The rectifying circuit 222 includes diodes D1 to D4. The diodes D1 to D4 constitute a diode bridge, and rectify the AC power from the secondary winding of the transformer TRI to convert the AC power into DC power.

The choke coil L3 and the capacitor C3 are connected to each other in series between output nodes of the rectifying circuit 222. The choke coil L3 and the capacitor C3 constitute an LC filter, and remove a ripple component generated by switching operations of the switching devices Q5 to Q8, which is included in the DC current output from the rectifying circuit 222.

The current sensor 223 detects a current flowing through the choke coil L3, and outputs the detected value to the charging ECU 250.

The output circuit 230 outputs a DC voltage VDC from the DC-DC converter 220 to the battery 150. The output circuit 230 includes a diode D5, a relay RY4, and a voltage sensor 231.

The diode D5 is a diode for preventing a backflow. The diode D5 is connected to the electric power line on the positive side such that a direction from the DC-DC converter 220 toward the relay RY4 is a forward direction in the electric power line on the positive side.

The relay RY4 is provided between the DC-DC converter 220 and the output terminal of the charging apparatus 200, and is connected to the DC-DC converter 220 and the output terminal of the charging apparatus 200. The relay RY4 makes switching between supply and cutoff of electric power from the charging apparatus 200 to the outside of the charging apparatus 200.

The voltage sensor 231 is provided between the output terminals of the charging apparatus 200, and is connected to the output terminals of the charging apparatus 200. The voltage sensor 231 detects a DC voltage VDC output from the charging apparatus 200, and outputs the detected value to the charging ECU 250.

The charging ECU 250, which may function as a controller, controls the AC-DC converter 210 and the DC-DC converter 220 based on a control signal from the ECU 300 (see FIG. 1). As main control to be executed by the charging ECU 250, the charging ECU 250 executes feedback control for controlling charging power to the battery 150 to a target value (target electric power). More specifically, the charging ECU 250 generates the target electric power on the assumption that a normal sinusoidal AC voltage is input therein based on the detected values of the current sensor 214 and the voltage sensor 215. The charging ECU 250 adjusts a duty ratio of a pulse width modulation (PWM) signal for each of the switching devices Q5 to Q8 included in the inverter circuit 221 based on the detected values of the current sensor 223 and the voltage sensor 231, thereby controlling the output power (charging power) from the rectifying circuit 222 to the target electric power.

Next, cooperative control will be described. In the charging apparatus 200 configured as described above, an abnormal voltage waveform may be input therein from the external power supply 500. Examples of the abnormal voltage waveform may include a distorted sinusoidal waveform, a sinusoidal waveform including instantaneous voltage drop, and a rectangular waveform. In this case, the electric power supplied from the external power supply 500 to the AC-DC converter 210 may be less than that at normal times. Despite this, when the charging power is supplied from the DC-DC converter 220 to the battery 150 as usual, a power balance between the supply power and the charging power may be lost. As a result, a variation in the output voltage VH of the AC-DC converter 210 is likely to occur, which may cause a failure of the charging apparatus 200. Specifically, there is concern about an overvoltage being applied to the charging apparatus 200 or an overcurrent flowing from the external power supply 500 to the charging apparatus 200.

As a countermeasure, when the output voltage VH of the AC-DC converter 210 falls outside the predetermined reference range, the charging apparatus 200 according to this embodiment controls the AC-DC converter 210 and the DC-DC converter 220 such that charging is temporarily stopped and is resumed after the lapse of a predetermined period of time. In the disclosed embodiment, this control is also referred to as "cooperative control." By executing the cooperative control, it is possible to protect the charging apparatus 200.

On the other hand, for example, when an inexpensive power generator is used as the external power supply 500, abnormality of a voltage waveform may continue for a relatively long time. In this case, in the charging apparatus 200, an intermittent operation of charging is repeated. As a result, sufficient charging power cannot be secured and a charging time is likely to be too long.

Further, a variation in the voltage supplied from the external power supply 500 may occur due to the repetition of the cooperative control, depending on an installed capacity (or electric power supply capability) of the external power supply 500. Therefore, when there are other devices that operate with electric power supplied from the external power supply 500, operations of these devices are likely to be unstable. For example, flickering may occur in an electric light.

Therefore, according to this embodiment, when the output voltage VH falls outside the reference range, the AC-DC converter 210 and the DC-DC converter 220 are controlled such that the charging power decreases stepwise until the output voltage VH falls within the reference range. Hereinafter, the charging power control in this embodiment will be described in detail.

Figure 3:
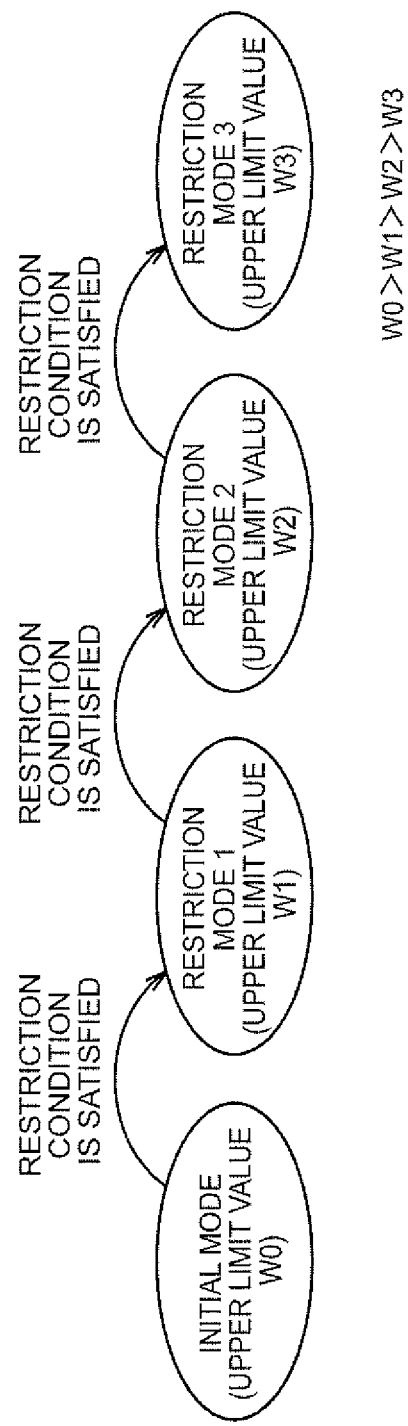
FIG. 3 is a state transition diagram illustrating charging power control in the first embodiment.

The charging power control will be described. FIG. 3 is a state transition diagram illustrating charging power control in the first embodiment. Referring to FIG. 2 and FIG. 3, the charging apparatus 200 has an initial mode, and restriction modes 1 to 3.

When charging from the external power supply 500 to the battery 150 starts, the charging apparatus 200 is in the initial mode. In the initial mode, feedback control of the AC-DC converter 210 and the DC-DC converter 220 is executed such that the charging power becomes equal to or less than W0.

In the initial mode, when a predetermined restriction condition is satisfied, the charging apparatus 200 transitions from the initial mode to restriction mode 1. In restriction mode 1, the charging power is restricted to be equal to or less than a value (upper limit value W1) that is less than the upper limit value W0 of the charging power in the initial mode.

The restriction condition is determined to be satisfied, for example, when the number of times the cooperative control is executed within a predetermined period of time reaches a predetermined value. For example, when the cooperative control is further executed three times within ten seconds after the output voltage VH falls outside the reference range and the cooperative control starts, the restriction condition is determined to be satisfied.

When the restriction condition is satisfied in restriction mode 1, the charging apparatus 200 transitions from restriction mode 1 to restriction mode 2. In restriction mode 2, the charging power is restricted to be equal to or less than a value (an upper limit value W2) that is less than the upper limit value W1 of the charging power in restriction mode 1.

Similarly, when the restriction condition is satisfied in restriction mode 2, the charging apparatus 200 transitions from restriction mode 2 to restriction mode 3. In restriction mode 3, the charging power is restricted to be equal to or less than a value (an upper limit value W3) that is less than the upper limit value W2 of the charging power in restriction mode 2.

Figure 4:
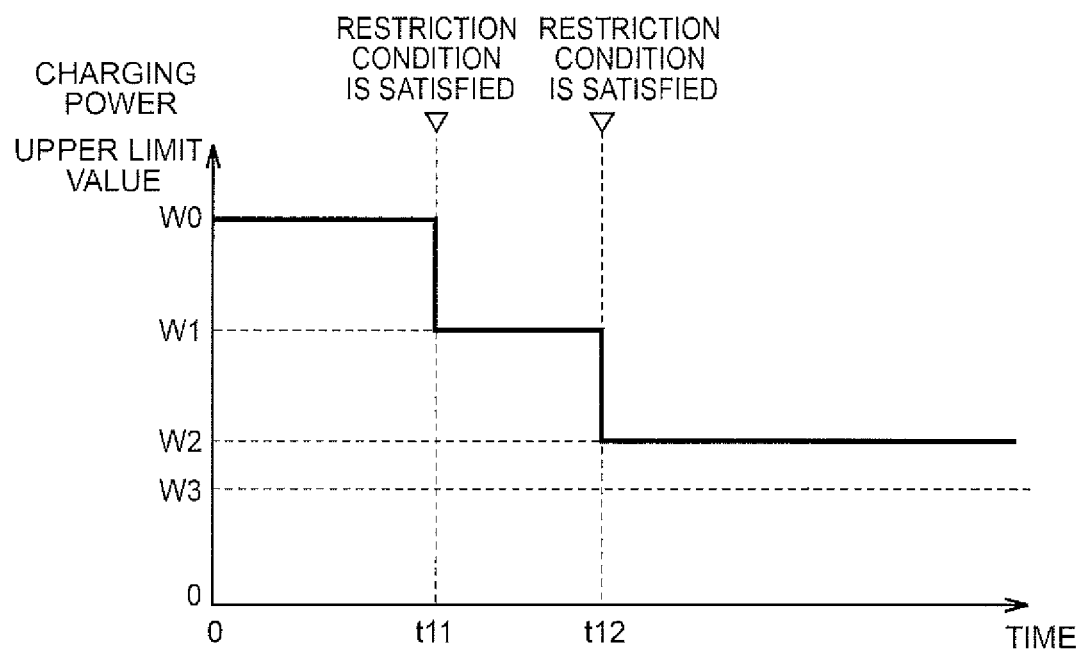
FIG. 4 is a time chart illustrating an example of the charging power control in the first embodiment.
Figure 7:
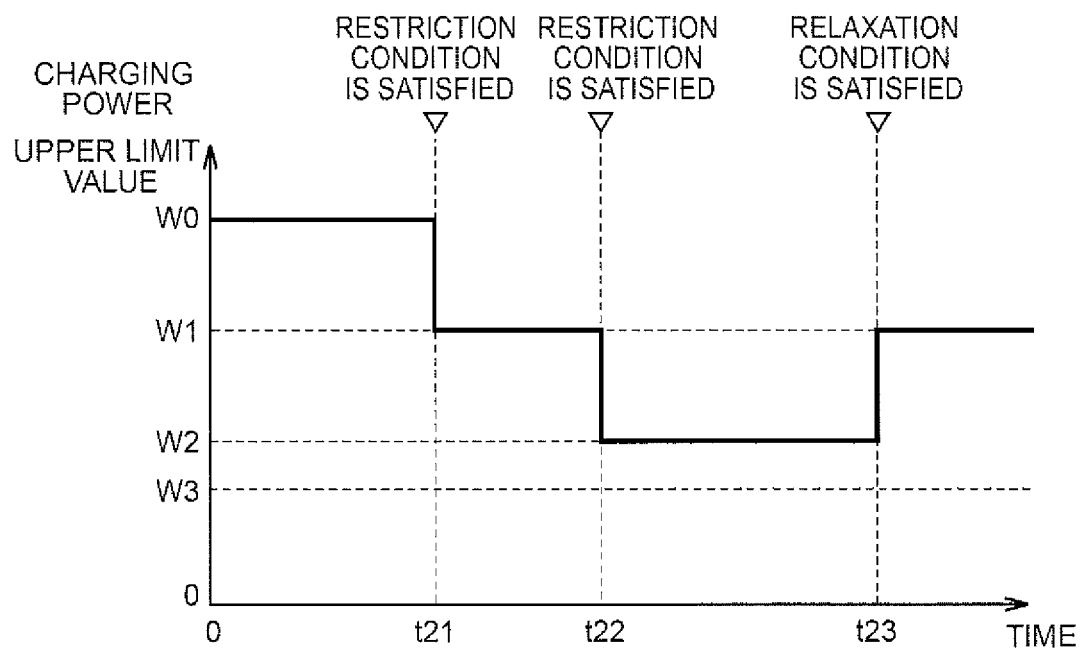
FIG. 7 is a time chart illustrating an example of the charging power control in the second embodiment.

FIG. 4 is a time chart illustrating the charging power control in the first embodiment. In FIG. 4 and FIG. 7 described later, the abscissa axis represents an elapsed time, and the ordinate axis represents an upper limit value of the charging power.

Referring to FIG. 2 and FIG. 4, since the charging apparatus 200 is in the initial mode up to time t11, the charging power is restricted to be equal to or less than W0. When the restriction condition is satisfied at time t11, the charging apparatus 200 transitions from the initial mode to restriction mode 1. In addition, the upper limit value of the charging power is changed from W0 to W1. When the restriction condition is satisfied at time t12, the charging apparatus 200 transitions from restriction mode 1 to restriction mode 2. In addition, the upper limit value of the charging power is changed from W1 to W2.

Thus, in this embodiment, when abnormality of the voltage waveform continues, the control for reducing the charging power stepwise is executed. Accordingly, since conditions under which a power balance between the electric power supplied from the external power supply 500 and the charging power supplied to the battery 150 is achieved can be found, it is possible to suppress a variation in the output voltage VH of the AC-DC converter 210, thereby protecting the charging apparatus 200. Further, when the output voltage VH falls within the reference range, charging of the battery 150 is performed under the condition of that moment. That is, since charging is performed under the condition under which the charging power is largest among the conditions under which the power balance is achieved, it is possible to secure as much charging power as possible, unlike a case in which the charging power is greatly restricted all at once.

While the example in which the upper limit value of the charging power is changed stepwise has been described with reference to FIG. 4, a method of changing the upper limit value is not limited to this. As long as the upper limit value is changed stepwise, the degree (rate) of reduction in the upper limit value may be changed, for example, each time the restriction condition is satisfied in FIG. 4.

Further, while the configuration in which the restriction conditions in the respective restriction modes are the same has been described with reference to FIG. 3 and FIG. 4, the restriction conditions may be different from each other among the restriction modes.

Figure 5:
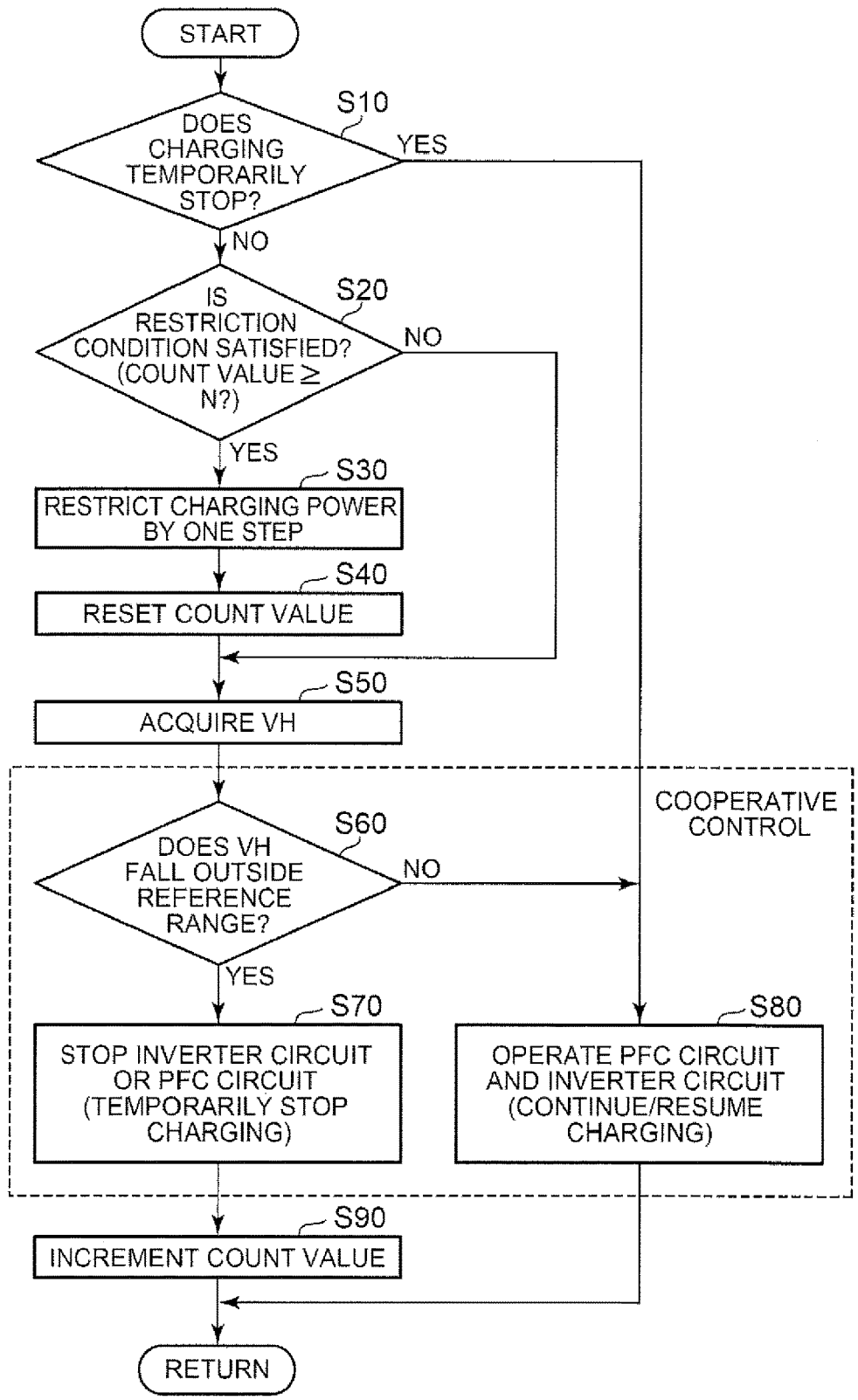
FIG. 5 is a flowchart illustrating the charging power control in the first embodiment.

FIG. 5 is a flowchart illustrating the charging power control in the first embodiment. Each of the flowchart illustrated in FIG. 5 and a flowchart illustrated in FIG. 8, which will be described later, is called from a main routine at intervals of a predetermined time or each time a predetermined condition is satisfied, and then executed. Although the steps in the flowcharts are basically implemented by a software process executed by the charging ECU 250, the steps may be implemented by hardware (an electronic circuit) provided in the charging ECU 250.

The charging ECU 250 includes a counter for counting the number of times the operation of the PFC circuit 213 or the inverter circuit 221 has been stopped. An initial value of the counter is zero. A count value is reset to zero each time a predetermined period of time (for example, 10 seconds) has elapsed.

Referring to FIG. 2 and FIG. 5, the charging ECU 250 determines in S10 whether charging control of the battery 150 is (temporarily) stopped. When the charging control is stopped (YES in S10), the charging ECU 250 proceeds to a process of S80 and operates the PFC circuit 213 and the inverter circuit 221 to resume charging of the battery 150.

On the other hand, when charging of the battery 150 is being performed (NO in S10), the charging ECU 250 determines whether the restriction condition is satisfied (S20). More specifically, the charging ECU 250 determines that the restriction condition is satisfied when the count value within the above-described predetermined period of time reaches N (for example, N=3). An execution start time of the cooperative control may be used as a start time of the predetermined period of time.

When the restriction condition is satisfied (YES in S20), the charging ECU 250 proceeds to a process of S30 and changes the upper limit value of the charging power to be supplied to the battery 150 to a value one step below the current upper limit value (see time t11 and time t12 in FIG. 4). Then, the charging ECU 250 resets the count value to an initial value (S40) and proceeds to a process of S50. On the other hand, when the restriction condition is not satisfied (NO in S20), the charging ECU 250 skips the processes of S30 and S40 and proceeds to the process of S50.

In S50, the charging ECU 250 acquires the output voltage VH of the AC-DC converter 210. The charging ECU 250 determines whether the output voltage VH falls outside a reference range indicating that the output voltage VH is a normal value (S60).

When the output voltage VH falls within the reference range (NO in S60), the charging ECU 250 proceeds to a process of S80 and continue the operations of the PFC circuit 213 and the inverter circuit 221.

When the output voltage VH falls outside the reference range (YES in S60), the charging ECU 250 proceeds to a process of S70 and stops the operation of the inverter circuit 221 or the PFC circuit 213.

More specifically, when the output voltage VH is lower than a lower limit value V1 of the reference range, the charging ECU 250 stops the operation of the inverter circuit 221 while continuing the operation of the PFC circuit 213. That is, since the output from the charging apparatus 200 is stopped while the input into the charging apparatus 200 is continued, the capacitor C2 is charged. Accordingly, an excessive decrease in the output voltage VH is suppressed. On the other hand, when the output voltage VH is higher than an upper limit value V2 of the reference range, the charging ECU 250 stops the operation of the PFC circuit 213 while continuing the operation of the inverter circuit 221. That is, since the input into the charging apparatus 200 is stopped while the output from the charging apparatus 200 is continued, the capacitor C2 discharges electric power. Accordingly, an excessive increase in the output voltage VH is suppressed.

When the charging ECU 250 stops the operation of the inverter circuit 221 or the PFC circuit 213, the charging ECU 250 increments the count value by one (S90). When the process of S80 or S90 ends, the charging ECU 250 returns to the process of the main routine. Processes of S60 to S80 correspond to the cooperative control.

Even when the output voltage VH falls outside the reference range due to an input of an abnormal waveform from the external power supply 500, an erroneous diagnosis of an abnormality in the charging apparatus 200 may be made. Therefore, when the charging ECU 250 stops the operation of the PFC circuit 213 or the inverter circuit 221 because the output voltage VH falls outside the reference range, preferably, diagnosis masking is performed (generation of a diagnosis is stopped) so that an erroneous diagnosis is not made.

As described above, in the first embodiment, the process shown in the flowchart of FIG. 5 is executed repeatedly. Accordingly, when the output voltage VH falls outside the reference range, the charging power decreases stepwise until the output voltage VH falls within the reference range. Accordingly, since the condition under which a power balance between the electric power supplied from the external power supply 500 and the charging power supplied to the battery 150 is achieved can be found, it is possible to suppress a variation in the output voltage VH of the AC-DC converter 210, thereby protecting the charging apparatus 200. Further, when the output voltage VH falls within the reference range, charging is performed such that the charging power does not exceed the upper limit value of-the charging power at that time. That is, since charging is performed under the condition under which the charging power is largest among the conditions under which the power balance is achieved, it is possible to secure as much charging power as possible, unlike a case in which the charging power is greatly restricted all at once. Therefore, it is possible to prevent the charging time from being too long.

Further, since the variation in the output voltage VH of the AC-DC converter 210 is suppressed, it is possible to prevent the operations of other devices that operate with the electric power supplied from the external power supply 500 from being unstable. Accordingly, it is possible to reduce occurrence of flickering in these devices.

Second Embodiment

According to the description of the first embodiment, when the restriction condition is satisfied, the charging power is restricted to a value at least one step below the upper limit value of the charging power in the mode at that time. In a second embodiment, it is further determined whether a predetermined relaxation condition is satisfied, and the restriction of the charging power is relaxed when the relaxation condition is satisfied.

Figure 6:
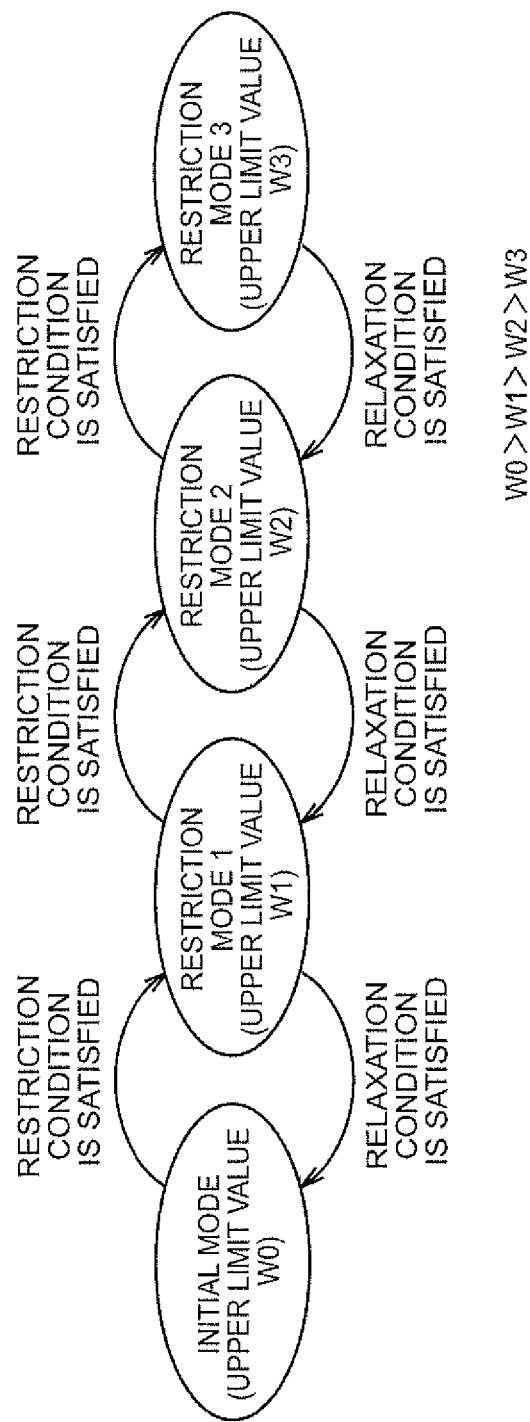
FIG. 6 is a state transition diagram illustrating charging power control in a second embodiment.

FIG. 6 is a state transition diagram illustrating the charging power control in the second embodiment. Referring to FIG. 2 and FIG. 6, since a transition between modes when the restriction condition is satisfied in each of an initial mode and restriction modes 1 to 3 is the same as the transition in the first embodiment, description thereof will not be repeated.

In the second embodiment, it is determined whether the relaxation condition, in addition to the restriction condition, is satisfied. In restriction mode 3, when a state in which the output voltage VH falls within the reference range and the cooperative control is not executed continues for a predetermined period of time (for example, 10 minutes), the charging apparatus 200 determines that the relaxation condition is satisfied and returns from restriction mode 3 to restriction mode 2. In addition, the upper limit value of the charging power is relaxed from W3 to W2. Since the same applies to return from restriction mode 2 to restriction mode 1 and return from restriction mode 1 to the initial mode, description thereof will not be repeated.

When the relaxation condition is satisfied, the charging apparatus 200 may return directly to the initial mode in place of returning to the initial mode stepwise as described above. That is, for example, the charging apparatus 200 may return from restriction mode 3 to the initial mode while skipping restriction modes 1, 2.

FIG. 7 is a time chart illustrating the charging power control in the second embodiment. Referring to FIG. 2 and FIG. 7, since the control up to time t22 is the same as the control up to the time t12 in the time chart illustrated in FIG. 4, description thereof will not be repeated. When the relaxation condition is satisfied at time t23, the charging apparatus 200 returns from restriction mode 2 to restriction mode 1. In addition, the upper limit value of the charging power is changed from W2 to W1.

Figure 8:
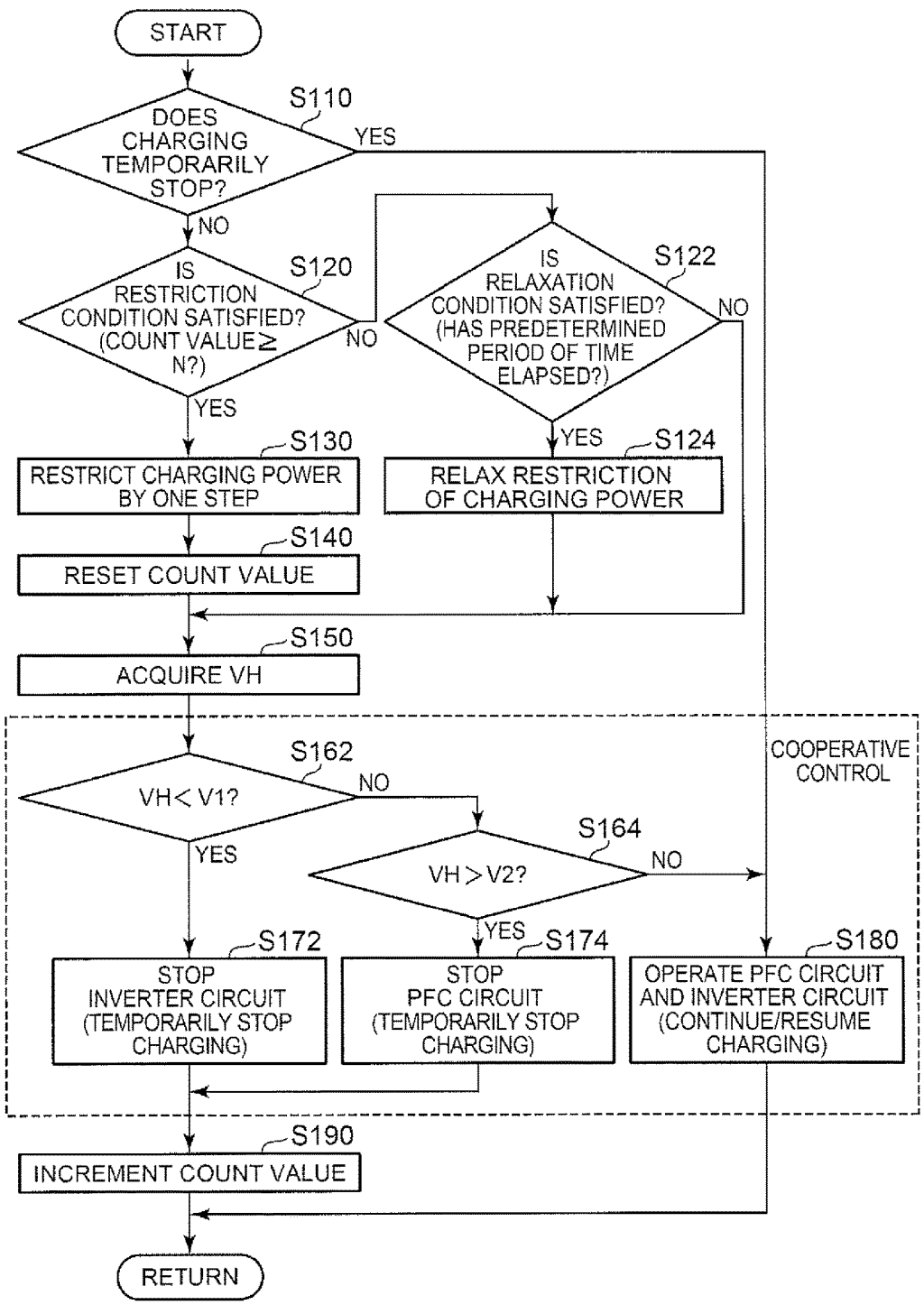
FIG. 8 is a flowchart illustrating the charging power control in the second embodiment.

FIG. 8 is a flowchart illustrating the charging power control in the second embodiment. Referring to FIG. 2 and FIG. 8, this flowchart is different from the flowchart (see FIG. 5) in the first embodiment, in that the processes of S122 and S124 are further provided and S162, S164, S172, and S174 in which the processes of S60 and S70 are described in detail are provided. Since processes of S110, S120, S130, and S140 are the same as the processes of S10, S20, S30, and S40 in the flowchart of FIG. 5, respectively, description thereof will not be repeated.

When the restriction condition is not satisfied (NO in S120), the charging ECU 250 determines whether the relaxation condition is satisfied (S122). When the relaxation condition is satisfied (YES in S122), that is, for example, when a state in which the cooperative control is not executed continues for a predetermined period of time, the charging ECU 250 relaxes the restriction of the charging power (S124). Specifically, the charging ECU 250 changes the upper limit value of the charging power to be supplied to the battery 150, to an upper limit value one step larger than the current upper limit value (see time t23 in FIG. 7).

When the relaxation condition is not satisfied (NO in S122), the charging ECU 250 skips the processes of S124 and proceeds to the process of S150.

In S150, the charging ECU 250 acquires the output voltage VH of the AC-DC converter 210. The charging ECU 250 determines whether the output voltage VH falls outside the reference range (S162 and S164).

When the output voltage VH is lower than the lower limit value V1 of the reference range (YES in S162), the charging ECU 250 stops the operation of the inverter circuit 221 while continuing the operation of the PFC circuit 213 (S172). That is, since the output from the charging apparatus 200 is stopped while an input into the charging apparatus 200 is continued, the capacitor C2 is charged. Accordingly, an excessive decrease in the output voltage VH is suppressed.

On the other hand, when the output voltage VH is higher than the upper limit value V2 of the reference range (YES in S164), the charging ECU 250 stops the operation of the PFC circuit 213 while continuing the operation of the inverter circuit 221 (S174). That is, since the input into the charging apparatus 200 is stopped while the output from the charging apparatus 200 is continued, the capacitor C2 discharges electric power. Accordingly, an excessive increase in the output voltage VH is suppressed.

After executing the process of S172 or S174, the charging ECU 250 increments the count value by one (S190). On the other hand, when the output voltage VH falls within the reference range (NO in S164), the charging ECU 250 proceeds to the process of S180 to continue or resume the operation of the PFC circuit 213 and the operation of the inverter circuit 221. When the process of S180 or S190 ends, the charging ECU 250 returns to the main routine. The processes of S162 to S180 correspond to the cooperative control.

As described above, according to the second embodiment as well as according to the first embodiment, it is possible to secure as much charging power as possible while protecting the charging apparatus 200 even when an abnormal voltage waveform is input into the charging apparatus 200 from the external power supply 500. Further, in the second embodiment, when the cooperative control is not executed for a predetermined period of time, the restriction of the charging power is relaxed because there is a possibility that the input of the abnormal waveform from the external power supply 500 has ended. Accordingly, when the external power supply 500 is stabilized, it is possible to shorten the charging time since charging can be performed with larger charging power than when the cooperative control is being executed.

The disclosed embodiments should be considered as being illustrative in all respects, rather than restrictive. The scope of the disclosure is intended to be defined by the appended claims rather than the description of the above-described embodiments and to include any modifications within the meaning and scope equivalent to the claims.

What is claimed is:

1. A charging apparatus configured to be able to charge a battery with alternating-current power that is supplied from an external power supply, the charging apparatus comprising:
a first conversion circuit that converts the alternating-current power supplied from the external power supply into direct-current power;
a second conversion circuit that converts an output voltage from the first conversion circuit into a voltage for the battery and supplies the voltage to the battery; and
a controller configured to change charging power to be supplied to the battery by controlling the first conversion circuit and the second conversion circuit when the output voltage falls outside a predetermined reference range, and to determine whether the output voltage in the changed charging power falls within the reference range,
wherein when the output voltage falls outside the reference range, the controller controls the first conversion circuit and the second conversion circuit such that the charging power decreases stepwise until the output voltage falls within the reference range.

2. The charging apparatus according to claim 1, wherein:
when the output voltage from the first conversion circuit falls outside the reference range, the controller executes cooperative control to control the first conversion circuit and the second conversion circuit such that supply of the charging power is temporarily stopped; and each time a restriction condition is satisfied, the controller controls the first conversion circuit and the second conversion circuit such that the charging power decreases stepwise, the restriction condition being a condition that the number of times the cooperative control is executed within a predetermined period of time reaches a predetermined value.

3. The charging apparatus according to claim 2, wherein the controller is configured to decrease an upper limit value of the charging power each time the restriction condition is satisfied.

4. The charging apparatus according to claim 2, wherein the controller is configured such that, when the output voltage falls within the predetermined reference range and a state in which the cooperative control is not executed continues for a predetermined period of time after the restriction condition is satisfied, the controller controls the first conversion circuit and the second conversion circuit such that the charging power increases stepwise to the charging power before the restriction condition is satisfied.

5. The charging apparatus according to claim 2, wherein the controller is configured such that, when the output voltage falls within the predetermined reference range and a state in which the cooperative control is not executed continues for a predetermined period of time after the restriction condition is satisfied, the controller controls the first conversion circuit and the second conversion circuit such that the charging power becomes the charging power before the restriction condition is satisfied.

6. The charging apparatus according to claim 1, wherein:
the first conversion circuit includes a power factor correction circuit;
the second conversion circuit includes an inverter circuit; and
the controller is configured to stop an operation of the inverter circuit or the power factor correction circuit when the output voltage from the first conversion circuit falls outside the reference range, and to operate the inverter circuit and the power factor correction circuit when the output voltage from the first conversion circuit falls within the reference range.

7. The charging apparatus according to claim 1, wherein:
the first conversion circuit includes a power factor correction circuit;
the second conversion circuit includes an inverter circuit; and
the controller is configured to:
1) continue an operation of the power factor correction circuit and stop an operation of the inverter circuit when the output voltage from the first conversion circuit is lower than a lower limit value of the reference range,
2) continue the operation of the inverter circuit and stop the operation of the power factor correction circuit when the output voltage from the first conversion circuit is higher than an upper limit value of the reference range, and
3) operate the inverter circuit and the power factor correction circuit when the output voltage from the first conversion circuit falls within the reference range.

* * * * *